(12) United States Patent
Kim et al.

(10) Patent No.: US 7,652,978 B2
(45) Date of Patent: Jan. 26, 2010

(54) TRANSMITTING APPARATUS OF OFDM SYSTEM AND METHOD THEREOF

(75) Inventors: Nam-Il Kim, Daejeon (KR); In-Hwa Jung, Daejeon (KR); Young-Hoon Kim, Daejeon (KR); Sang-Woo Nam, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 650 days.

(21) Appl. No.: 11/193,237

(22) Filed: Jul. 28, 2005

(65) Prior Publication Data

US 2006/0120269 A1 Jun. 8, 2006

(30) Foreign Application Priority Data

Dec. 3, 2004 (KR) .................. 10-2004-0101032

(51) Int. Cl.
*H04J 11/00* (2006.01)
*H04J 15/001* (2006.01)
(52) U.S. Cl. .............. 370/208; 370/203; 370/478; 370/328; 375/259; 375/260; 710/260
(58) Field of Classification Search .......... 370/208, 370/203, 478, 464, 328; 375/259, 260, 146, 375/147; 710/260
See application file for complete search history.

(56) References Cited

U.S. PATENT DOCUMENTS 7,075,885 B2 * 7/2006 Thorson et al. ............ 370/209

2002/0178313 A1 * 11/2002 Gary ..................... 710/260
2004/0086027 A1 * 5/2004 Shattil ................... 375/146
2004/0136314 A1 * 7/2004 Jung et al. ............... 370/203

OTHER PUBLICATIONS

"Reducing the peak-to-average power ratio of multicarrier modulatino by selected mapping", R. Baumi, et al., Electronics Letters, Oct. 24, 1996, vol. 32, No. 22, pp. 2056-2057.
"Block coding scheme for reduction of peak to mean envelop power ratio or multicarrier transmission schemes", A. Jones, et al., Electronics Letters, Dec. 8, 1994, vol. 30, No. 26, pp. 2098-2099.

* cited by examiner

*Primary Examiner*—Aung S Moe
*Assistant Examiner*—Jamal Javaid
(74) *Attorney, Agent, or Firm*—Blakely, Sokoloff, Taylor & Zafman LLP

(57) ABSTRACT

The present invention relates to a transmitter in an OFDM system for improving the PAPR, and a method thereof. According to the exemplary embodiment of the present invention, channel encoding is performed in order to correct a data transmission error of a radio channel, a predetermined bit of the channel encoded data is bit-inverted by using a mask bit or a mask bit sequence, and a PAPR of the signal is reduced. Accordingly, reduction of transmission efficiency which has been generated in block coding and DSI methods is not generated when the signal is transmitted because an additional bit is not required.

9 Claims, 3 Drawing Sheets

[FIG. 1]
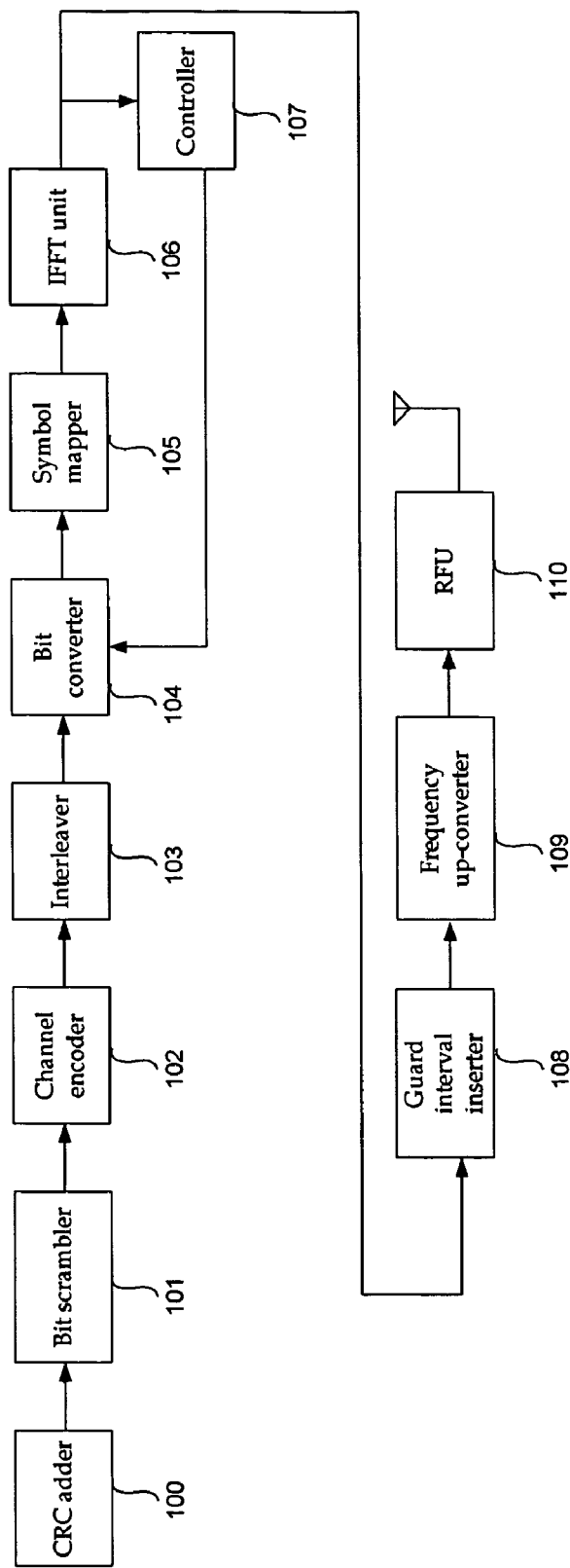

[FIG. 2]
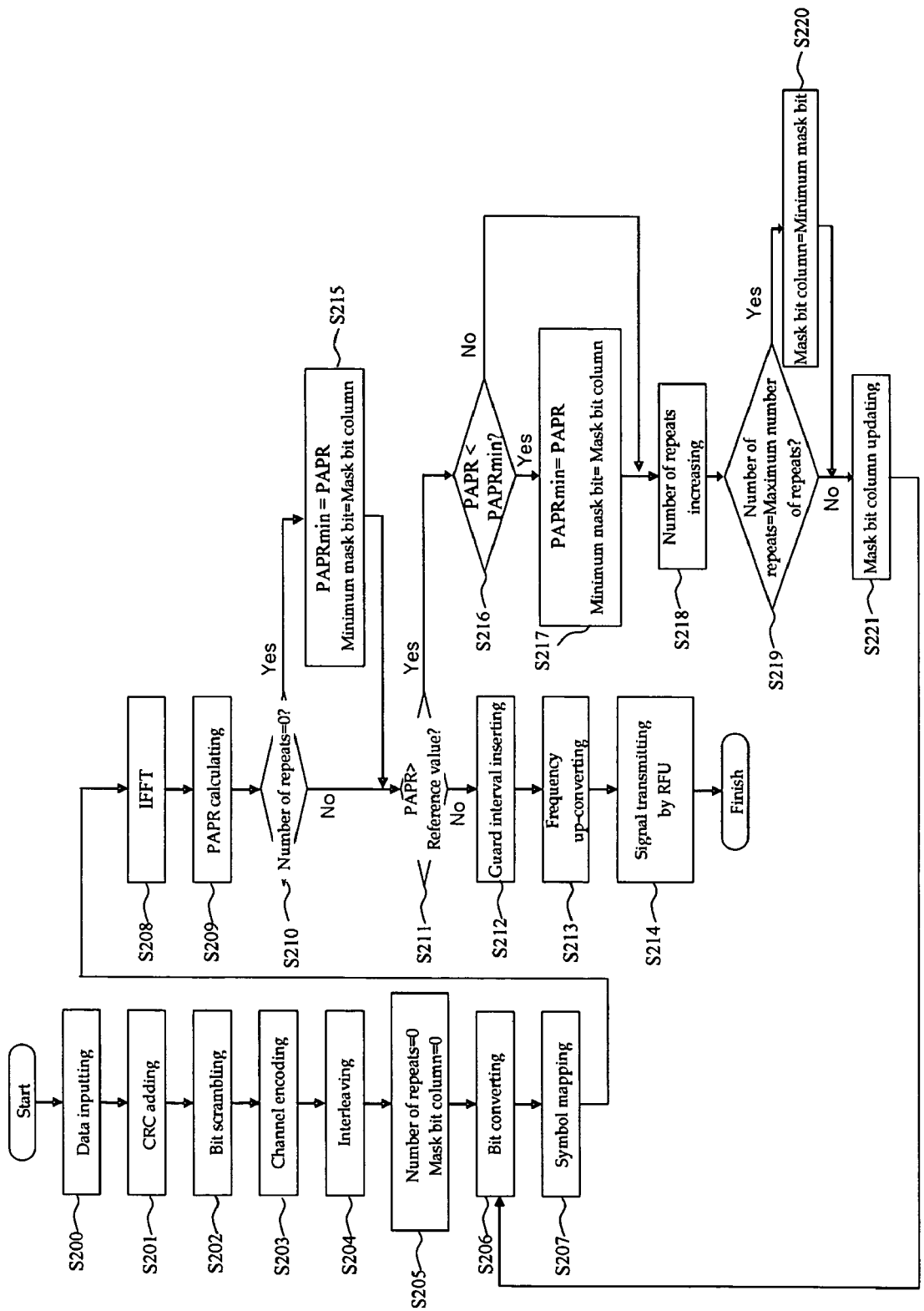

[FIG. 3]
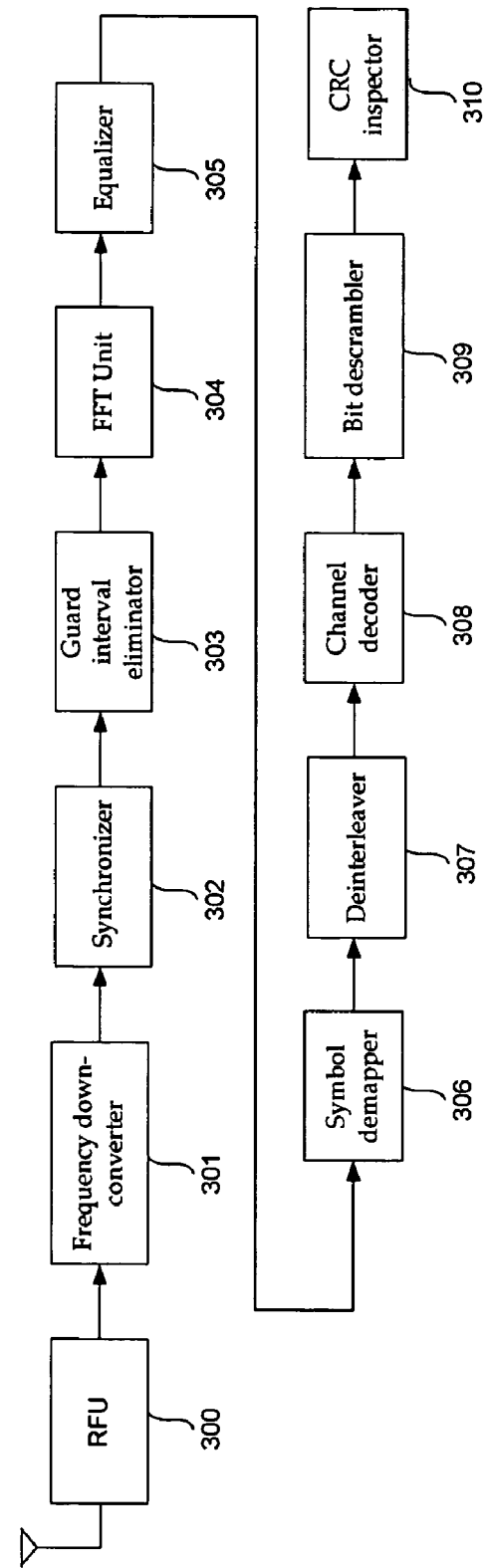

TRANSMITTING APPARATUS OF OFDM SYSTEM AND METHOD THEREOF

CROSS-REFERENCE TO RELATED APPLICATION

This application claims priority to and the benefit of Korean Patent Application 10-2004-0101032 filed in the Korean Intellectual Property Office on Dec. 3, 2004, the entire content of which is incorporated herein by reference.

BACKGROUND OF THE INVENTION (a) Field of the Invention

The present invention relates to an orthogonal frequency division multiplexing (OFDM) communication system. More specifically, the present invention relates to an apparatus for improving a peak-to-average power ratio (PAPR) of the OFDM system, and a method thereof.

(b) Description of the Related Art

As the dissemination and use of information continues to dramatically increase, telecommunication techniques are rapidly being developed.

Requirements of various visual information multimedia services including conventional voice services have also increased, and therefore various techniques for transmitting data at high-speed have been developed in order to satisfy customers using the services. Among the techniques, the OFDM technique is being particularly applied.

The OFDM technique is for transmitting data at high-speed in a multi-path channel environment by using a plurality of subcarriers having orthogonality with each other in a given frequency bandwidth. In the OFDM technique, a signal is transmitted and received by fast Fourier transform (FFT) and inverse fast Fourier transform (IFFT) methods.

The OFDM method has high bandwidth efficiency and high effectiveness against multi-path fading, and therefore it has been widely used in the 4$^{th}$ generation mobile communication system (4G), terrestrial digital TV (Digital TV), and Wireless Local Area Networks (WLAN).

However, the OFDM method problematically has a high peak-to-average power ratio (PAPR) of a transmission signal because signals having a maximum value are generated in a time domain as signals having a limited range in a frequency domain are inverse-fast-Fourier-transformed.

Accordingly, the transmission signal according to the OFDM method is distorted due to the high PAPR when the transmission signal is transmitted through a nonlinear device such as a high power amplifier (HPA).

Specifically, the PAPR shows a high value when signals input to be transmitted have the same value and phase.

Accordingly, various studies for improving the PAPR in the OFDM communication system have been ongoing.

For example, a selected mapping method (SLM), a dummy sequence insertion (DSI) method, a tone reduction method (TRM), and a block coding method have been suggested to reduce the PAPR in the OFDM communication system.

In the SLM, the input signal is multiplied by various phase vectors, a signal having a lowest PAPR is detected among the multiplied signals, and the detected signal is transmitted.

That is, the signal having the lowest PAPR is selected and transmitted after one information signal is multiplied by U number of the phase vectors which are different from each other, and inverse-fast-Fourier-transformed.

Therefore, performance is proportionally increased as a number of the phase vectors is increased according to the SLM. However, IFFT operation is also increased as the number of phase vectors is increased, and a PAPR calculation process is additionally increased in the time domain.

A signal multiplied by a predetermined phase vector is transmitted by a transmission terminal, and therefore information on the phase vector is required to be added to the transmission signal so as to inform a receipt terminal of which phase vector has been multiplied by the signal in the transmission terminal.

In this case, several subcarriers are required to transmit the phase vector information. However, a data rate is reduced to be less than a usual data rate because of the subcarriers.

The more phase vectors are used, the more subcarriers are required to inform of the phase vector information. Accordingly, the data rate is further reduced.

In the TRM, a pseudo impulse is generated by using predetermined subcarriers, and a maximum peak value in the time domain is canceled out with the pseudo impulse in order to reduce the PAPR.

While fewer calculations are performed in the TRM comparing to the SLM, the data rate is reduced by the number of subcarriers used for generating the pseudo impulse.

The block coding method is for transmitting a signal by coding remaining subcarriers such that the PAPR of the signal may be reduced, and the DSI method is for transmitting a signal by inserting a dummy sequence to remaining subcarriers.

IEEE ELECTRONICS LETTERS VOL. 30 NO. 25, pp 2098-2099 (published in December, 1994) introduced a transaction about the block coding method under the title of "Block coding scheme for reduction of peak to mean envelope power ratio of multicarrier transmission schemes" by A. E. Jones et al.

Still, there is a problem in that the transmission efficiency is reduced in the block coding method and the DSI method.

The information disclosed in this Background of the Invention section is only for enhancement of understanding of the background of the invention, and therefore, unless explicitly described to the contrary, it should not be taken as an acknowledgement or any form of suggestion that this information forms the prior art that is already known in this country to a person of ordinary skill in the art.

SUMMARY OF THE INVENTION

The present invention provides an apparatus for transmitting high quality signals by reducing a peak-to-average power ratio (PAPR) without any signal distortion in an orthogonal frequency division multiplexing (OFDM) communication system.

The present invention discloses a transmitter of the OFDM communication system.

The transmitter includes a bit scrambler for performing bit scrambling of a transmission signal; a channel encoder for encoding the bit scrambled transmission signal; a bit inverter for performing bit inversion of a predetermined bit of the encoded transmission signal by using a predetermined mask bit; a symbol mapper for performing symbol mapping of the bit-inverted transmission signal; an inverse fast Fourier transform (IFFT) unit for performing inverse-fast-Fourier-transform of the symbol mapped data into an OFDM symbol of a time domain; and a controller for estimating a peak-to-average power ratio (PAPR) of inverse-fast-Fourier-transformed OFDM symbols in the time domain, comparing the PAPR to a predetermined reference value, and outputting the OFDM symbol by varying a mask bit to the bit inverter or outputting the OFDM symbol of the time domain according to the result of the comparison between the PAPR and the reference value.

The controller outputs the OFDM symbol to the bit inverter by varying the mask bit of the OFDM symbol when the estimated PAPR is greater than the reference value, and outputs the OFDM symbol of the time domain when the estimated PAPR is less than the reference value; updates the minimum estimate and the minimum mask bit value according to the result of the comparison between the estimated PAPR and the minimum mask bit value; and establishes the estimated PAPR to be the minimum PAPR and the current mask bit column to be the minimum mask bit value when the estimated PAPR is less than the reference value.

The present invention discloses a method of transmitting a signal in an OFDM system.

In the method, a) bit scrambling of a transmission signal is performed, and the transmission signal is encoded; b) a predetermined bit of the encoded transmission signal is inverted by using a predetermined mask bit; c) symbol mapping of the bit-inverted transmission signal is performed and the transmission signal is inverse-fast-Fourier transformed into an OFDM symbol of a time domain; and d) a PAPR of the OFDM symbol of the time domain is estimated, and the PAPR is controlled according to a result of comparison between the estimate PAPR and a reference value.

In d), the mask bit in b) is varied when the estimated PAPR is greater than the reference value, and the OFDM symbol of the time domain in d) is outputted when the estimated PAPR is less than the reference value.

BRIEF DESCRIPTION OF THE DRAWINGS

FIG. 1 shows a schematic diagram for representing a transmitter of the OFDM system according to the exemplary embodiment of the present invention.

FIG. 2 shows a block diagram for representing a signal process in the transmitter according to the exemplary embodiment of the present invention.

FIG. 3 shows a schematic diagram for representing the receiver of the OFDM communication system according to the exemplary embodiment of the present invention.

DETAILED DESCRIPTION OF THE PREFERRED EMBODIMENTS

An embodiment of the present invention will hereinafter be described in detail with reference to the accompanying drawings.

An apparatus for reducing a peak-to-average power ratio PAPR in an orthogonal frequency division multiplexing (OFDM) system according to an exemplary embodiment of the present invention and method thereof will be described with reference to figures.

The present invention provides a method for improving a high PAPR problem caused by using multi-carriers in the OFDM communication system, in which a bit inversion (BI) method is used.

According to the exemplary embodiment of the present invention, high quality communication is provided because power efficiency of a high power amplifier (HPA) is increased and non-linear distortion is prevented when the PAPR is reduced.

In addition, no signal distortion is generated, and the method according to the exemplary embodiment of the present invention is used regardless of modulation methods and a number of subcarriers.

FIG. 1 shows a schematic diagram for representing a transmitter of the OFDM system for improving the PAPR according to the exemplary embodiment of the present invention.

As shown in FIG. 1, the transmitter according to the exemplary embodiment of the present invention includes a cyclic redundancy code CRC adder 100, a bit scrambler 101, a channel encoder 102, an interleaver 103, a bit inverter 104, a symbol mapper 105, an inverse fast Fourier transform (IFFT) unit 106, a controller 107, a guard interval inserter 108, a frequency up-converter 109, and a radio frequency unit (RFU) 110.

The CRC adder 100 adds a CRC bit to input user data bits, and the bit scrambler 101 performs bit scrambling of input data.

The channel encoder 102 performs channel encoding of the input data, the interleaver 103 interleaves the input data, and the bit inverter 104 performs bit inversion of a predetermined bit.

The symbol mapper 105 performs symbol mapping in a predetermined manner, and the IFFT unit 106 performs inverse-fast-Fourier-transform of the input data and outputs an OFDM symbol of the time domain. The controller 107 outputs the OFDM symbol by changing a mask bit of the OFDM symbol or outputs the OFDM symbol of the time domain according to the result of the comparison after estimating a PAPR of the input signal and comparing the PAPR to a predetermined value.

The guard interval inserter 108 inserts a guard interval into the input data, the frequency up-converter 109 up-converts a frequency of the input signal, and the RFU 110 converts the input signal into a RF bandwidth signal for radio transmission and outputs the converted signal.

Operation of the transmitter according to the exemplary embodiment of the present invention will be described.

The CRC adder 100 receives the user data bits to be transmitted, adds the CRC bit to the received information data bits, and outputs the information bits to the bit scrambler 101.

The bit scrambler 101 receives the CRC inserted data, performs bit scrambling of the data, and outputs the data to the channel encoder 102.

The channel encoder 102 performs channel encoding of the bit scrambled data.

The channel encoder 102 uses encoding methods such as convolution encoding, turbo encoding, low-density parity-check (LDPC) encoding, and repeat and accumulate (RA) encoding.

The interleaver 103 receives the channel encoded data and interleaves the data, and provides the interleaved data to the bit inverter 104.

The bit inverter 104 performs the bit inversion of a random or predetermined bit of the interleaved data by an exclusive AND operation with the mask bit input from the controller 107.

At this time, a number of bits in a mask bit column is equal to a number of inversion bits, and the number of inversion bits corresponds to a block size of a code block and a channel environment.

The inversion bits include fewer bits compared to a code block of a system having a great coding gain, and therefore the channel coding operation causes no error of the transmission data.

The symbol mapper 105 receives the bit-inverted data, and performs symbol mapping of the data by binary phase shift keying (BPSK), quadrature phase shift keying (QPSK), or a quadrature amplitude modulation (QAM) method.

The IFFT unit 106 performs IFFT of the symbol mapped data and transforms it into the OFDM symbol of the time domain. The guard interval inserter 108 receives the OFDM symbol of the time domain and inserts the guard interval into the OFDM symbol.

The frequency up-converter 109 multiplies a real part of the OFDM symbol by a cosine signal, multiplies an imaginary part of the OFDM symbol by a sine signal, adds the real part multiplied by the cosine signal to the imaginary part multiplied by the sine signal, and performs frequency up-conversion of the OFDM symbol.

The RFU 110 receives the frequency up-converted signal, converts the signal into an RF bandwidth signal for radio transmission, and transmits the RF bandwidth signal through an antenna.

The controller 107 receives the output signal of the IFFT unit 106, and estimates the PAPR of the output signal of the IFFT unit.

The controller 107 transmits the OFDM symbol of the time domain to the guard interval adder 108 when the estimated PAPR is less than a predetermined threshold value, and varies the mask bit of the OFDM symbol to transmit to the bit inverter 104 when the PAPR is greater than the predetermined threshold value.

An operation of the controller 107 will be further described with reference to FIG. 2.

FIG. 2 shows a block diagram for representing a signal process for improving the PAPR in the transmitter according to the exemplary embodiment of the present invention.

As shown in FIG. 2, the CRC adder 100 receives the data in step S200 and adds the CRC bit to the received data in step S201. The bit scrambler 101 performs the bit scrambling of the data in step S202. The channel encoder 102 performs the channel encoding of the bit scrambled data in step S203, and the bit interleaver 103 interleaves the channel encoded data in step S204. The interleaved data is inputted to the bit inverter 104.

The mask bit column is reset to 0 at an initial operation (a number of repeats is 0) in step S205. Accordingly, the interleaved signal inputted to the bit inverter 104 is inputted to the symbol mapper 105 without being bit-inverted, and the symbol mapper 105 performs symbol mapping in step S207. The IFFT unit 106 performs the IFFT operation on the symbol mapped data in step S208, and transmits the data to the controller 107. The controller 107 calculates the PAPR in step S209.

In addition, the controller 107 compares the estimated PAPR to a reference value in step S211. The guard interval inserter 108 inserts the guard interval to the symbol mapped data in step S212 when the estimated PAPR is not greater than the reference value, and transmits the data through the frequency up-converter 109 and RFU 110 in steps S213 and 214. Accordingly, the signal is transmitted by the antenna.

The controller 107 receiving the OFDM signal from the IFFT unit 106, estimates the PAPR, and determines the number of repeats in step S210. The PAPR is stored as a minimum PAPR value (PAPRmin), and a current mask bit column is stored as a minimum mask bit value in step S215 when the number of repeats is 0. The PAPR is compared to the reference value in step S211.

The current PAPR is compared to the PAPRmin in step S216 when the PAPR is greater than the reference value in step S211, and the current PAPR is substituted for the PAPRmin and the minimum mask bit value is substituted for the mask bit column in step S217 when the current PAPR is less than the PAPRmin. The number of repeats is increased in step S218.

The increased number of repeats is compared to a predetermined maximum number of repeats in step S219. The mask bit column is converted into the minimum mask bit value in step S220, and updated in step S221 when the increased number of repeats is equal to the predetermined maximum number of repeats.

At this time, the mask bit column is updated in step S221 without converting the mask bit column when the increased number of repeats is less than the predetermined maximum number of repeats.

The controller 107 applies the updated mask bit column to the bit inverter 104, and the bit inverter 104 performs bit inversion in step S206. The bit-inverted signal undergoes the same process as in the above description, and therefore no further description will be provided.

While the bit inversion is performed by using the mask bits, a signal having the minimum PAPR value is transmitted in a case that a PAPR of less than the threshold value is not detected.

A receiver for receiving and restoring the signal output from the transmitter according to the exemplary embodiment of the present invention will be described.

FIG. 3 shows a schematic diagram for representing the receiver of the OFDM communication system for improving the PAPR according to the exemplary embodiment of the present invention.

As shown in FIG. 3, the receiver according to the exemplary embodiment of the present invention includes an RFU 300, a frequency down-converter 301, a synchronizer 302, a guard interval eliminator 303, an FFT unit 304, an equalizer 305, a symbol demapper 306, a deinterleaver 307, a channel decoder 308, a bit descrambler 309, and a CRC inspector 310.

The RFU 300 converts the received signal into the RF bandwidth signal, and the frequency down-converter 301 down-converts a frequency of the input signal.

The synchronizer 302 compensates frequency and time distortions, the guard interval eliminator 303 eliminates the guard interval inserted by the transmitter, and the FFT unit 204 performs fast-Fourier-transform on the inverse-fast-Fourier-transformed signal.

The equalizer 305 compensates a signal distortion caused by the multi-path channel, the symbol demapper 306 performs symbol demapping of the input signal, and the deinterleaver 307 deinterleaves the input signal.

The channel decoder 308 decodes the signal encoded by the transmitter, the bit descrambler 309 descrambles the input signal, and the CRC inspector 310 inspects the CRC inserted in the signal.

Operation of the receiver according to the exemplary embodiment of the present invention will now be described.

The RFU 300 receives the signal input through an antenna and transmits the signal to the frequency down-converter 301. The frequency down-converter 301 performs down-conversion on the frequency of the signal. The signal is converted to a complex signal including real and imaginary parts, and is transmitted to the synchronizer 302.

The synchronizer 302 performs frequency and time synchronization of the receipt OFDM symbol, compensates the frequency and time distortions, and transmits the signal to the guard interval eliminator 303.

The guard interval eliminator 303 eliminates the guard interval from the input data, and transmits the signal in which the guard interval is eliminated to the FFT unit 304. The FFT unit performs the FFT operation on the signal.

The equalizer 305 receives the fast-Fourier-transformed signal, and compensates the signal distortion caused by the multi-path channel. The symbol demapper 306 performs the symbol demapping on the signal, and the deinterleaver 307 deinterleaves the signal.

The channel decoder 308 receives the deinterleaved data, and compensates the data bit distorted at the time that the bit inversion is performed by the transmitter. The bit descrambler 309 descrambles the data, and the CRC inspector 310 inspects the CRC.

Additional information transmission which has been required in the conventional SLM and partial transmit sequence (PTS) methods for reducing the PAPR is not required according to the exemplary embodiment of the present invention.

The PAPR is reduced not by inserting an additional bit but by performing the bit inversion, and therefore the reduction of the transmission efficiency which has been generated in the block coding and DSI methods is not generated either when the signal is transmitted.

As described, the high PAPR caused by the multi-carrier in the OFDM communication system is effectively improved by using the bit conversion (BI) method according to the exemplary embodiment of the present invention.

Accordingly, high quality communication is provided because power efficiency on a high power amplifier (HPA) is increased and non-linear distortion is prevented when the PAPR is reduced.

In addition, no signal distortion is generated in the BI method, and it is used regardless of modulation methods and a number of subcarriers.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A transmitter of a communication system according to an orthogonal frequency division multiplexing (OFDM) method, comprising:
    a bit scrambler for performing bit scrambling of a transmission signal;
    a channel encoder for encoding the bit scrambled transmission signal;
    a bit inverter for performing bit inversion of predetermined bits of the encoded transmission signal by performing an exclusive AND operation on the encoded transmission signal with a mask bit column, wherein the mask bit column includes a number of bits equal to the number of bits to be inverted, and the number of bits to be inverted is determined based on a code block size and a channel environment and is fewer than the code block size;
    a symbol mapper for performing symbol mapping of the bit-inverted transmission signal;
    an inverse fast Fourier transform (IFFT) unit for performing inverse-fast-Fourier transform of the symbol mapped data into an OFDM symbol of a time domain; and
    a controller for estimating a peak-to-average power ratio (PAPR) of the inverse-fast-Fourier-transformed OFDM symbol in the time domain, comparing the estimated PAPR to a reference value, and, based on a result of the comparing, varying the mask bit column of the OFDM symbol to cause the bit inverter to invert the predetermined bits of the encoded transmission signal when the estimated PAPR is greater than the reference value, and outputting the OFDM symbol of the time domain when the estimated PAPR is not greater than the reference value.

2. The transmitter of claim 1, wherein the controller establishes the initially estimated PAPR to be a minimum estimate and a current mask bit column to be a minimum mask bit value.

3. The transmitter of claim 2, wherein the controller updates the minimum estimate and the minimum mask bit value according to the result of the comparison between the estimated PAPR and the minimum mask bit value, and establishes the estimated PAPR to be the minimum PAPR and the current mask bit column to be the minimum mask bit value when the estimated PAPR is less than the reference value.

4. The transmitter of claim 1, further comprising:
    a cyclic redundancy check (CRC) adder for adding a CRC bit to the transmission signal and outputting the transmission signal to the bit scrambler;
    an interleaver for interleaving the encoded transmission signal;
    a guard interval inserter for inserting a guard interval to the OFDM symbol of the time domain outputted from the controller;
    a frequency up-converter for up-converting a frequency of the signal in which the guard interval is inserted; and
    a radio frequency unit for converting the frequency up-converted signal to a radio frequency bandwidth signal for radio transmission.

5. A method for transmitting a signal in an OFDM system, comprising:
    a) performing bit scrambling of a transmission signal, and encoding the transmission signal;
    b) inverting predetermined bits of the encoded transmission signal by performing an exclusive AND operation on the encoded transmission signal with a mask bit column, wherein the mask bit column includes a number of bits equal to the number of bits to be inverted, and the number of bits to be inverted is determined based on a code block size and a channel environment;
    c) performing symbol mapping of the bit-inverted transmission signal and inverse-fast-Fourier transform (IFFT) of the transmission signal into an OFDM symbol of a time domain;
    d) estimating a peak-to-average power ratio (PAPR) of the OFDM symbol of the time domain; and
    e) controlling the PAPR according to a result of comparison between the estimated PAPR and a reference value, wherein controlling the PAPR is performed by varying the mask bit column of the OFDM symbol to cause inversion of the predetermined bits of the encoded transmission signal in b) when the estimated PAPR is greater than the reference value, and by outputting the OFDM symbol of the time domain when the estimated PAPR is not greater than the reference value.

6. The method of claim 5, wherein a number of repeats and the mask bit column are established to be 0 when data are initially input, and bit inversion is performed by using the mask bit column in b); and
    the estimated PAPR is established to be a minimum value and a current mask bit column is established to be a minimum mask bit when the number of repeats is 0 in d).

7. The method of claim 6, wherein in d),
    when the estimated PAPR is greater than the reference value,
    the minimum value and the minimum mask bit are updated by comparing the minimum value to the estimated PAPR, the number of repeats are increased, the mask bit column is updated, and b) is reinstated.

8. The method of claim 7, wherein in d),
    the mask bit column is established to be the minimum mask bit value and the mask bit column is updated when the increased number of repeats is a predetermined maximum number of repeats, and b) is reinstated.

9. The method of claim 5, further comprising:
    adding a cyclic redundancy check (CRC) bit to the transmission signal prior to a);
    interleaving the encoded transmission signal after a); and
    inserting a guard interval to the OFDM symbol of the time domain and up-converting a frequency after d).

* * * * *